United States Patent [19]

Raychaudhuri et al.

[11] Patent Number: 5,585,158

[45] Date of Patent: Dec. 17, 1996

[54] RECORDABLE OPTICAL ELEMENT USING LOW ABSORPTION MATERIALS

[75] Inventors: Pranab K. Raychaudhuri, Rochester; Fridrich Vazan, Pittsford, both of N.Y.

[73] Assignee: Eastman Kodak Company, Rochester, N.Y.

[21] Appl. No.: 482,718

[22] Filed: Jun. 7, 1995

[51] Int. Cl.$^6$ ....................................................... B32B 3/00
[52] U.S. Cl. ..................... 428/64.1; 428/64.2; 428/64.4; 428/64.5; 428/64.6; 428/412; 428/457; 428/913; 430/270.1; 430/270.11; 430/495.1; 430/945; 369/283; 369/288
[58] Field of Search ..................... 428/64.1, 64.2, 428/64.4, 64.5, 64.6, 412, 457, 913; 430/270, 495, 945, 270.1, 270.11, 495.1; 369/203, 288

[56] References Cited

U.S. PATENT DOCUMENTS

| | | | |
|---|---|---|---|
| 4,940,618 | 7/1990 | Hamada et al. | 428/64 |
| 4,985,349 | 1/1991 | Ohkawa et al. | 430/495 |
| 4,990,387 | 2/1991 | Ohkawa | 428/64 |
| 5,013,635 | 5/1991 | Ohkawa et al. | 430/495 |
| 5,063,096 | 11/1991 | Kohara et al. | 428/64 |
| 5,102,708 | 4/1992 | Matsubara et al. | 428/64 |
| 5,208,088 | 5/1993 | Tominaga et al. | 428/64 |
| 5,238,722 | 8/1993 | Yashiro et al. | 428/64 |

FOREIGN PATENT DOCUMENTS

| | | |
|---|---|---|
| 2005520 | of 0000 | Canada . |
| 0353393 | of 0000 | European Pat. Off. . |

OTHER PUBLICATIONS

*Optical Recording*, Allan B. Marchant (1990).

*Primary Examiner*—Patrick Ryan
*Assistant Examiner*—Elizabeth Evans
*Attorney, Agent, or Firm*—Raymond L. Owens

[57] ABSTRACT

There is disclosed a recordable optical element that has a substrate and on the surface of the substrate, a recording layer and a light reflecting layer. The recording layer has a material with the formula $Te_aGe_bC_cH_dO_e$ wherein a, b, c, d, and e are atomic percents and $(c+d)>40$, $d>10$, $a>5$, $b>5$, and $e \geq 0$ such that $a+b+c+d+e=100$; and the reflecting layer and the recording layer being selected such that the element $R_{max}$ or $R_{min}$ (element reflectivity) is about or greater than 70% at about 780 nm.

14 Claims, 3 Drawing Sheets

RECORDABLE OPTICAL ELEMENT USING LOW ABSORPTION MATERIALS

CROSS-REFERENCE TO RELATED APPLICATIONS

Reference is made to U.S. application Ser. No. 08/399,787 filed Mar. 7, 1995, entitled "Recordable Optical Element Using Low Absorption Materials" by Tyan et al.

FIELD OF THE INVENTION

The present invention relates to optical recording elements, particularly to those that are useful as recordable compact disks.

BACKGROUND OF THE INVENTION

There are many types of optical information carrying elements that are known. One of the popular forms of optical information containing element is the compact disk or CD. Digital information is stored in the form of low reflectivity marks or pits on an otherwise reflective background. Stringent specifications on CD formats have been published by Sony and Philips, and these formats are used as standards throughout the world. One of the most important format requirements is the background reflectivity which is specified to be greater than 70% at about 780 nm. This high reflectivity value is unusual when compared with other optical recording disks. In the latter case, the reflectivity normally is designed to be low in order to improve the absorption of the writing laser energy to facilitate the information recording process.

In CD's, the optical information is most often in the form of read only memory or ROM. Optical information is usually not recorded in real time but rather is produced by press molding. In a typical process, the recording substrates are first mass produced by press molding using a stamper containing the digital information to be reproduced. The press molded substrate is then overcoated with a reflective layer and then with an optional protective layer. In those areas having the deformations or pits, the reflectivity is lower than in those areas not having the deformations.

It is desirable to produce optical recording elements which are capable of being recorded in real time and producing a record that mimics the conventional CD on read out. In this manner, information can be recorded on the CD and the CD can be read back by conventional CD player.

It has been difficult to produce such optical recording elements because the recorded elements have to meet the strict specifications for CD. In particular, it has been difficult to produce recordable elements that will meet the >70% reflectivity requirement.

One method for forming a recordable element that mimics conventional mold pressed CD elements is to provide a transparent, heat deformable support having thereon, in order, a layer that absorbs recording radiation and a reflective layer. When radiated through the transparent support, the reflectivity varies with the thickness of the absorbing layer as a result of the light interference effect (FIG. 1). When an absorbing layer of very small thickness (much less than that corresponding to $R_{min}$) is used, the reflectivity is high, but such structure is not useful for recording purposes because of low thermal efficiency. The reflective layer is a very effective heat sink. Most of the writing energy absorbed next to the reflector in the optical recording layer is conducted away by the reflector. It is generally observed that the smallest useful thickness is that which produces reflectivity in the neighborhood of the first minimum in reflectance. To produce useful recording elements, therefore, requires materials which will produce >70% reflectance with thickness larger than this minimum useful thickness. Such materials are characterized by low optical absorption coefficients, contrary to the materials used in conventional recording structures where high optical absorption is needed. These low absorption materials when used in conventional media structure without a reflector generally do not perform well. Adequate sensitivity and contrast can only be achieved when incorporated in a complete optical interference structure using the reflector. Thus, generally speaking, materials that are appropriate for conventional recording structure are not appropriate for recordable CD structure, and vice versa.

Materials of this type based on organic dyes are described in U.S. Pat. No. 4,940,618, European Patent Application 0,353,393, and Canadian Patent 2,005,520.

One of the undesirable features of elements based on such organic dyes is their wavelength sensitivity. The desirable optical properties can only be obtained at wavelengths near the absorption edges of such dyes. As a result, the reflectivity and other properties of such elements depend strongly on wavelength. It is very difficult to meet all the stringent CD specifications throughout the entire range of wavelengths that the CD's are designed to function. It is nearly impossible to operate such elements using shorter wavelengths which are to be used in future generation CD's to increase the recording density.

However, U.S. application Ser. No. 08/399,787 filed Mar. 7, 1995 included some non-dye media which have satisfied the CD specified reflectivity. One of the shortcomings of such non-dye media is their relatively low thermal efficiency. The power required to write with full contrast is significantly greater than that required for the dye based recording elements.

SUMMARY OF THE INVENTION

It is an object of this invention to provide improved recording elements with significantly higher recording sensitivity and operable at a wide wavelength range while complying with CD specifications.

This object is achieved by a recordable element including a substrate and having on its surface, in order, an optical recording layer and a light reflecting layer, the improvement comprising:

a) the optical recording layer having at least two sublayers of different compositions; and b) the thickness of the optical recording layer and the reflecting layer being selected such that the $R_{min}$ reflectivity of the element is about or greater than 70% for a laser wavelength of about 780 nm.

ADVANTAGES

The composition and the thickness of the optical recording layer and the reflecting layer are such that the recording sensitivity for the element is superior to a single layer disk of identical $R_{min}$ reflectivity.

The composition and the thickness of the optical recording layer and the reflecting layer are such that the recording sensitivity for the element is superior to a single layer disk of identical $R_{max}$ reflectivity.

DETAILED DESCRIPTION OF THE INVENTION

Figure 1:
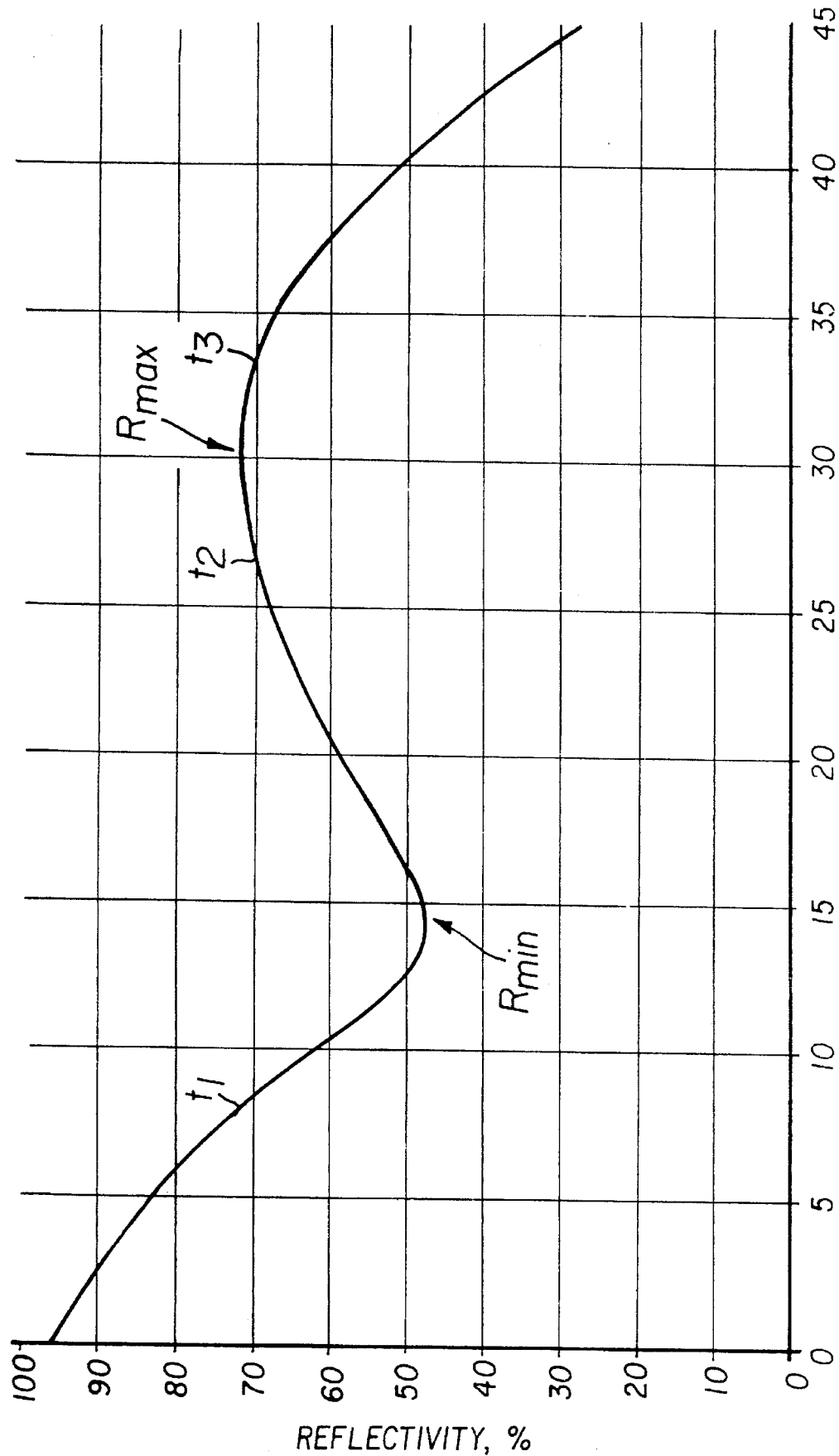
FIG. 1 is a typical plot of the reflectivity vs. the thickness of an optical recording element of FIG. 2a resulting from the light interference effect.

It is an important feature of the present invention that the reflecting layer 14 and the optical recording layer 12 of the element being selected such that the element $R_{min}$ or $R_{max}$ (element reflectivity) is about or greater than 70% in order to meet the CD specifications. The terms $R_{min}$ and $R_{max}$ are well understood in the art. In FIG. 1 is shown a representative curve of reflectivity vs. thickness for a typical optical element with a reflector at an arbitrary wavelength of light. The units on thickness are arbitrary. The curve is somewhat representative of all such materials in that the reflectivity starts high and then goes down to a minimum called $R_{min}$ due to destructive optical interference and then returns to a maximum point $R_{max}$ due to constructive optical interference. As shown for any given optical element, $R_{max}$ is always greater than $R_{min}$. With optical elements, the thickness is generally selected to be at $R_{max}$, although it has been found that, in accordance with the invention, the thickness can also be at or near $R_{min}$. With reference to FIG. 1, the term $R_{min}$ means the reflectivity value at about 14 thickness units (arbitrarily chosen) where optical interference causes a local minimum in the reflectivity vs. thickness curve; $R_{max}$ in this example is at about 30 thickness units where optical interference causes a local maximum in the reflectivity vs. thickness curve. Those skilled in the art will recognize that reflectivities can be measured by spectrophotometers.

Figure 2A:
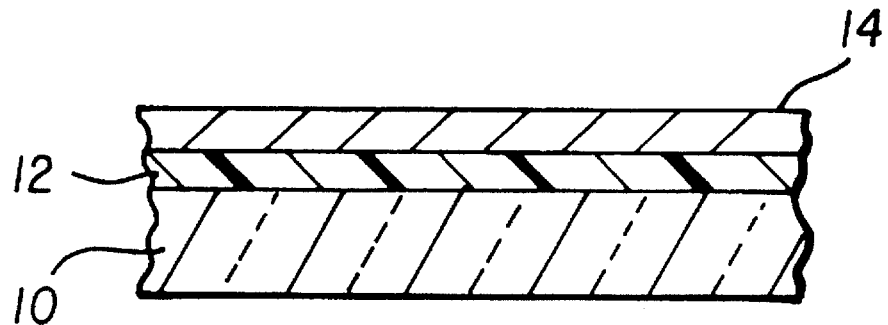
FIG. 2a is a schematic representation, in cross-section, of a single layer recording element.
Figure 2B:
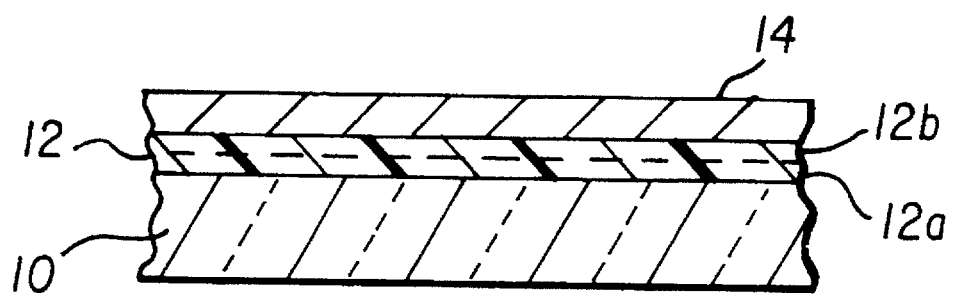
FIG. 2b is a schematic representation, in cross-section, of a bilayer element in accordance with the invention.

Optical elements according to this invention are shown in FIG. 2b include at least three layers. The substrate 10 has thereon, an optical recording layer 12 having two sublayers, and a reflective layer 14. Protective layers may also be used but will not be discussed since they are not necessary for the practice of this invention. The substrate 10 is transparent and light which illuminates the optical recording layer 12 passes through the substrate 10.

Recording is accomplished by marking the optical recording layer 12 with a write laser focused on the optical recording layer 12. The focused laser beam heats the optical recording layer 12 to temperatures substantially above the room temperature and induces changes in the media. The likely changes may include agglomeration of the metallic components in the layer, or the dissociation of material to form gaseous species which, in turn, causes the deformation of the media package in the form of bubbles, voids, or pits, etc. Some distortion of the substrate 10 material might also be induced. In any event, the combination of some or all of these changes forms marks which can then be read back by the focused read laser beam. The record thus consists of marks of relatively low reflectivity on a background of relatively high reflectivity in relation to the read laser light.

The preferred embodiment of the invention is that of a writable compact disk (CD) as shown in FIG. 2b. The write and read lasers are of the laser diode type and generally operate in the infrared region between 770 and 830 nm.

For a more complete explanation of the optical recording and play back processes as well as the construction of compact disks, see *Optical Recording*, Allan B. Marchant (1990).

The Substrate 10

The substrate 10 can be made from optically transparent resins with or without surface treatment. The preferred resins for the FIG. 2b embodiment are polycarbonate and polyacrylates. The substrate 10 may include a guide groove for laser tracking.

The Reflective Layer 14

The reflecting layer 14 can be any of the metals conventionally used for optical recording materials. Useful metals can be vacuum evaporated or sputtered and include gold, silver, aluminum, copper, and alloys thereof. Gold is the preferred material.

The Recording Layer or Optical Recording Layer 12

The present invention uses an optical recording layer 12 given by the formula ($Te_aGe_bC_cH_dO_e$), wherein a, b, c, d, and e are atomic percents and (c+d)>40, d>10, a>5, b>5, and e≧0 such that a+b+c+d+e=100, the reflecting layer and the optical recording layer 12 being selected such that the element $R_{min}$ or $R_{max}$ (element reflectivity) are about or greater than 70% at about 780 nm.

The preferred method of fabrication for the optical recording layer 12 is DC sputtering. The preferred target contains both the Te and Ge. The targets can be prepared by melt casting or powder metallurgy techniques. Alternatively, a co-sputtering method can be used where two or more sputtering targets are used, some contain the Te and some Ge. The atmosphere should contain a sputter gas such as Ar or Kr, and a hydrocarbon gas such as methane. Useful layers can also be prepared using other gases such as fluorides, $H_2$, $N_2$, and $NH_3$.

Layers containing Ge, Sb, Te, C, and H have been fabricated for optical applications (Okawa Japanese Kokai 171,289 (1990), U.S. Pat. No. 4,985,349, and European Patent Application 0290009 (1988)). These layers were designed, however, to be used for an optical recording layer 12 without reflectors. For such applications, it is desirable to have layers which are highly absorbing. For example, Okawa teaches the use of layers made with Q<35%, where Q=$CH_4$/(Ar+$CH_4$) is the fraction of $CH_4$ in the sputter gas. Okawa in European Patent Application 0290009 (1988) reported that for a layers fabricated with Q=50% and any of the metals in a long list including Te, Ge, and Sb, the complex optical index is about 3.7–0.59i. That layer, if incorporated in a structure as in FIG. 2, gives only 5.6% reflectance at the first interference minimum and 44.5% reflectance at the first maximum. These low reflectivity values are inadequate for CD applications. Layers made with lower Q values such as those suggested by Okawa are said to be even more absorbing and obviously even less suitable for CD applications. Furthermore FIG. 4 of U.S. Pat. No. 4,985,349 clearly indicated that it was not possible to produce layers with (C+H) content higher than 40 atomic % even when a sputtering atmosphere consisted entirely of $CH_4$ (i.e., Q=100%). One skilled in the art will conclude from these teachings, therefore, that it is not possible to produce a layer based on Ge, Te, Sb, C, H with optical constants suitable for CD applications even when a reflector is applied.

Quite surprisingly, (C+H) content of over 40% can not only be produced using Ge and Te as the components, but for those layers that contain more than 40% of (C+H), the optical properties are such that >70% reflectance can be obtained using a structure as represented in FIG. 2, using a gold reflector, and a layer thickness corresponding to the first maximum of the interference curve. When (C+H) is over 50%, >70% reflectance can be obtained even using a thickness corresponding to the first minimum of the interference curve. In addition to adequate reflectivity, such layers in the described structure with a gold reflector also demonstrated high recording sensitivity and contrast. The same layers, on the other hand, cannot be recorded with adequate sensitivity or contrast if the reflector is not used. These layers will be considered inappropriate for single layer optical recording media applications.

FIG. 1 is a standard mixture plot which shows, respectively, $R_{max}$ and $R_{min}$ for a recording material which has a reflecting layer 14 in the optical element. This plot satisfied the requirements that $R_{min}$ and or $R_{max}$ be equal to or greater than 70%.

For the fabrication of the recording layer 12, Ge and Te targets were sputtered in an atmosphere comprising $CH_4$ and/or other hydrocarbons. An alloy sputtering method could also have been used where the sputtering target could be constituted of the said element. A reflecting layer 14 was sputter deposited in an inert gas ambient. The target power and the flow rates and pressure of the reactive gas were controlled during the deposition of the recording layer so that the CD specified reflectivity (>70%) was achieved.

The optical properties of these optical recording layers 12 were tunable for use at shorter wavelengths. More importantly, the dependence of the optical properties on wavelength was discovered to be weak. These media appeared to have the potential of being suitable for the future generation high density CD's that are required to function in a wide range of recording laser wavelength.

Quite unexpectedly a compositional modulation along the thickness of the optical recording layer 12 results in remarkably high writing sensitivities. The aforementioned modification is achieved by increasing the reactive gas flow rate some time during sputter deposition. So the modified optical recording layer 12 is the one whose composition at the Au interface is different from that at the substrate interface. It is thus inferred that a modified layer includes at least two different sublayers—one adjacent to the substrate and the other adjacent to the reflector interface. We refer to these types of layers as the sublayers. It was also found that a diffused junction (reactive gas flow rate is gradually increased while continuing on the deposition for the second) sublayer works as well as the sharp junction (reactive gas flow rate is increased before the deposition of the second) sublayer. Although this invention includes sublayer or bilayer effects, it is understood that multi-layer or graded films also fall with the scope of this invention.

Figure 3:
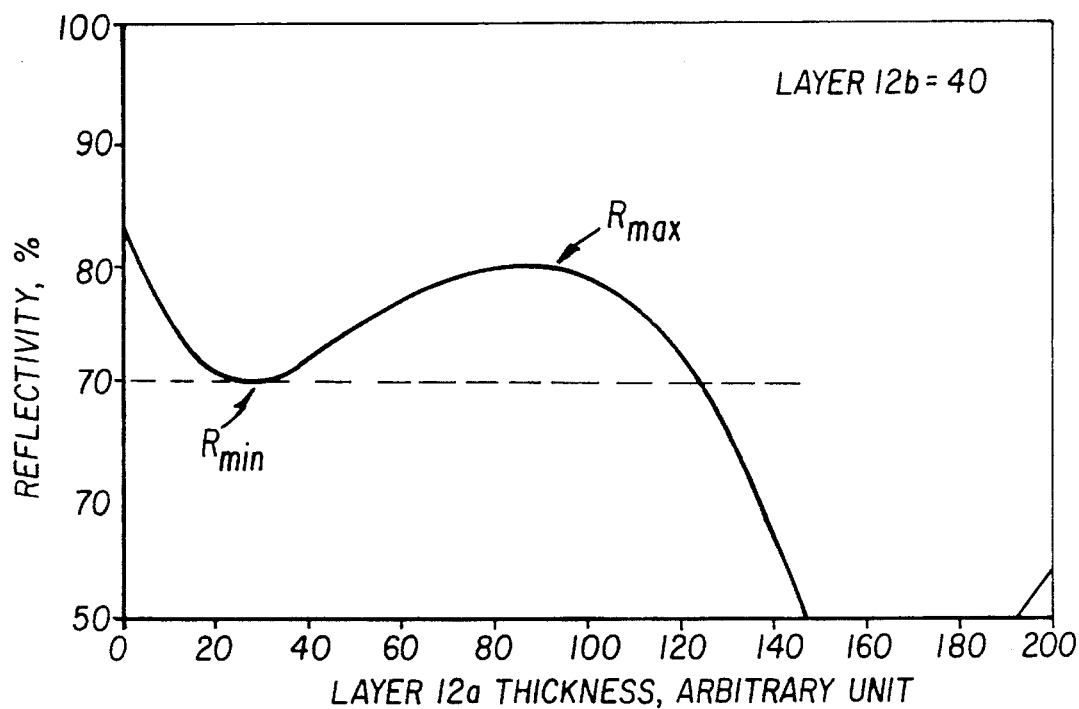
FIG. 3 is a plot of reflectivity vs. thickness of one optical recording element in accordance with the present invention of FIG. 2b.

More specifically, in accordance with the invention, the recording sensitivity of a recording element comprising a sublayer (FIG. 2b) is significantly higher than that of the layer 12 (FIG. 2a) prepared in entirety under a set of non-varying deposition conditions. The latter type of optical recording layer for the purpose of discussion will be termed as the single layer or the standard layer. It is readily recognized from FIG. 3 which is a plot of the reflectivity vs. the thickness of one optical recording element of the present invention that the requirement $R_{min}$ and/or $R_{max}$ being equal to or greater than 70% is met just as in FIG. 1.

The enhancement of sensitivity due to bilayer effect is not readily recognizable from the measured values of the optimum recording power (ORP) for the disks. The ORP depends not only on the inherent thermal properties of the active layer but also on the structural design of the disk.

According to FIG. 1, which is a plot of the reflectivity vs. the thickness of one single layer optical recording element, three structural designs for the recording element can be chosen—all of which will exhibit 70% reflectivity. At the recording layer thickness t1, the disk is generally found to be very insensitive. This is because the laser energy absorbed in this thin layer is believed quickly conducted away by the nearby reflector (typically highly conducting gold layer) preventing the active layer from reaching the temperature needed for recording. The layer, several hundred angstroms thick, which is adjacent to the reflector, does not take part in the recording process and is often referred to as the "dead layer". At thickness t2 and t3, the disks are recordable, but the ORPs were experimentally found not the same possibly due to the difference in the amounts of matter participating in the recording process. This may be termed as the thickness effect.

Same reasoning can be put forward for a bilayer recording element of the type of FIG. 2b. According to FIG. 3, which is a % reflectivity vs. thickness plot for the bilayer, the $R_{min}$ of 70% reflectivity can be realized using a layer 12a thickness of 23 and layer 12b thickness of 40 arbitrary units. A 70% reflective disk can also be made with a layer 12a thickness of 122 and layer 12b thickness of 40 units.

In short, the ORP of disks with identical reflectivity may not necessarily be the same because of the possible configuration, composition and/or thickness effect.

However, if some constraints are imposed, the ORPs can be used as a criterion for comparison of sublayer and single layer recording elements with respect to their true potential or inherent sensitivity. The conditions that could be imposed are that each disk be 70% reflective at either $R_{min}$ or $R_{max}$ position. We have chosen 70% reflectivity at $R_{min}$ as the criterion. We have selected this criterion with manufacturing process in mind. The disks with recording layer thickness that correspond to the positions are preferred when both robustness and throughput of the manufacturing process are considered.

A series of single layer as well as bilayer disks were made with varying reflectivities around the first minimum, where $R_{min}$ being approximately at 70% reflectivity. From the measured ORPs and % reflectivity of this series, the interpolation is made of the ORP to correspond to 70% reflectivity.

For single layer disks the reflectivity series is made by varying the deposition time keeping all other conditions constant, thereby producing several disks of identical composition but with varying thicknesses. For the sublayer series the reflectivity series can be made in more than one way.

It can be seen that for the single layer the choice of deposition parameters is very restricted. For example, for a given sputtering rate, the 70% $R_{min}$ is realized by one partial pressure/flow rate of $CH_4$ and deposition time. For the bilayer, significantly higher degrees of freedom exist, and the 70% reflectivity in first minimum position is achievable in many ways, namely, by adjustments of thickness composition and $CH_4$ flow rate, etc. for the individual sublayers.

Table 1 shows the deposition parameters of several bilayer discs constituted of the reflectivity series designated as the series #102. For example, the disc #6 was prepared by co-sputtering of Te and Ge targets using target powers of 12 and 52 watts, respectively. The composition of sputtering atmosphere was made up of added $CH_4$ gas to the Ar gas flowing at the rate of 10 standard cubic-centimeters per minute (sccm) at a pressure of 4.5 mTorr. The sublayer 12a is deposited on to substrate 10 (refer to FIG. 2b) for 30 seconds at a $CH_4$ partial pressure and flow rate of 1.38 mTorr and 4 sccm, respectively. The sublayer 12b was then deposited on to layer 12a for 35 seconds in higher flow rates and higher $CH_4$ partial pressure of 9 sccm and 2.8 mTorr, respectively. Deposition parameters of Discs #4 and disc #5 were identical to those for the disc #6 except that the sublayer 12b for the former two discs were deposited for longer periods of time. The reflecting layer 14 for all of these recording layers were 800 angstrom thick Au layer that was sputtered in pure Ar. These discs were also provided with a protective lacquer overcoats approximately 6 micron thick. These discs make a reflectivity series where the reflectivity varies due to the difference in the thickness of the 12b layer.

A spectrophotometer was used to determine the reflectivity of the discs at 780 nm. The reflectivity of the disc #4 is found to be the lowest in the series and corresponds approximately to the $R_{min}$ position. The dynamic performance of each of the discs were determined at linear speed of 2.8 m/s using an in-house automated tester. The ORP's and reflectivities so determined are also tabulated in the Table 1.

series #102 (bilayer). The circles in each group are connected by a dashed line with arrows pointing to the direction of increasing thickness. Each of these lines represents the ORP vs. reflectivity relationship from which ORPs at first minimum can be determined. It is seen that for this sublayer series the reflectivity at the first minimum is 65.5% and the corresponding ORP is 7.5 mW. The reflectivity at the first minimum for the single-layer series is 66.8% and the ORP is 9.5 mW. The sublayer is more sensitive than the single layer as the former requires lower power to write. However, we need a small correction to account for the small difference in their reflectivities.

Empirically an approximate relationship has been determined between the reflectivity and the ORP for one of the conditions. This is shown as sensitivity reference line C, in FIG. 4. Using this line, the ORPs at 70% reflectivity for the first minimum are projected to be 8.7 mW for the bilayer medium and 10.5 mW for the single layer. The bilayer recording disc in the above example is more sensitive than the single layer by ~1.8 mW. It is reasonable to assume that under some other processing conditions the improvement in sensitivity due to bilayer multilayer configuration can be greater than 1.8 mW. This is because the 70% reflectivity at first minimum position can be obtained in many different ways, namely, by adjusting the sublayer thicknesses, compositions, etc.

The invention has been described in detail with particular reference to certain preferred embodiments thereof, but it will be understood that variations and modifications can be effected within the spirit and scope of the invention.

TABLE 1

| Disc # | Target Wattage | | Ar flow & Pressure | | CH4 flowrate | | CH4 pressure, mTorr | | Deposition Tme, sec | | Reflectivity | ORP |
|---|---|---|---|---|---|---|---|---|---|---|---|---|
| | Ge | Te | sccm | mTorr | Layer 12a | Layer 12b | Layer 12a | Layer 12b | Layer 12a | Layer 12b | % | mW |
| 6 | 12 | 52 | 10 | 4.5 | 4 | 9 | 1.38 | 2.8 | 30 | 35 | 69.1 | 10 |
| 4 | 12 | 52 | 10 | 4.5 | 4 | 9 | 1.38 | 2.8 | 30 | 50 | 65.6 | 7.5 |
| 5 | 12 | 52 | 10 | 4.5 | 4 | 9 | 1.38 | 2.8 | 30 | 70 | 68.1 | 7 |

Table 2 shows similar deposition parameters for recording layers belonging to the series designated as series #115 which is a set of single-layers prepared using the same target powers as the bilayer series #102. However the $CH_4$ partial pressure and flow rate and deposition time were chosen such that the reflectivity at $R_{min}$ for this series also be approximately 70%. The ORP's of the disks and reflectivities of the disks are also tabulated in the Table 2.

TABLE 2

| Disk ID | Target Wattage | | Ar flow & Pressure | | CH4 flow & Pressure | | Dep. time | Reflectivity | ORP |
|---|---|---|---|---|---|---|---|---|---|
| | Ge | Te | sccm | mT | sccm | mT | sec | % | mW |
| 14 | 52 | 12 | 10 | 4.5 | 5.5 | 1.79 | 70 | 79.9 | 20 |
| 15 | 52 | 12 | 10 | 4.5 | 5.5 | 1.79 | 90 | 67.9 | 10 |
| 16 | 52 | 12 | 10 | 4.5 | 5.5 | 1.79 | 110 | 71 | 10 |

Figure 4:
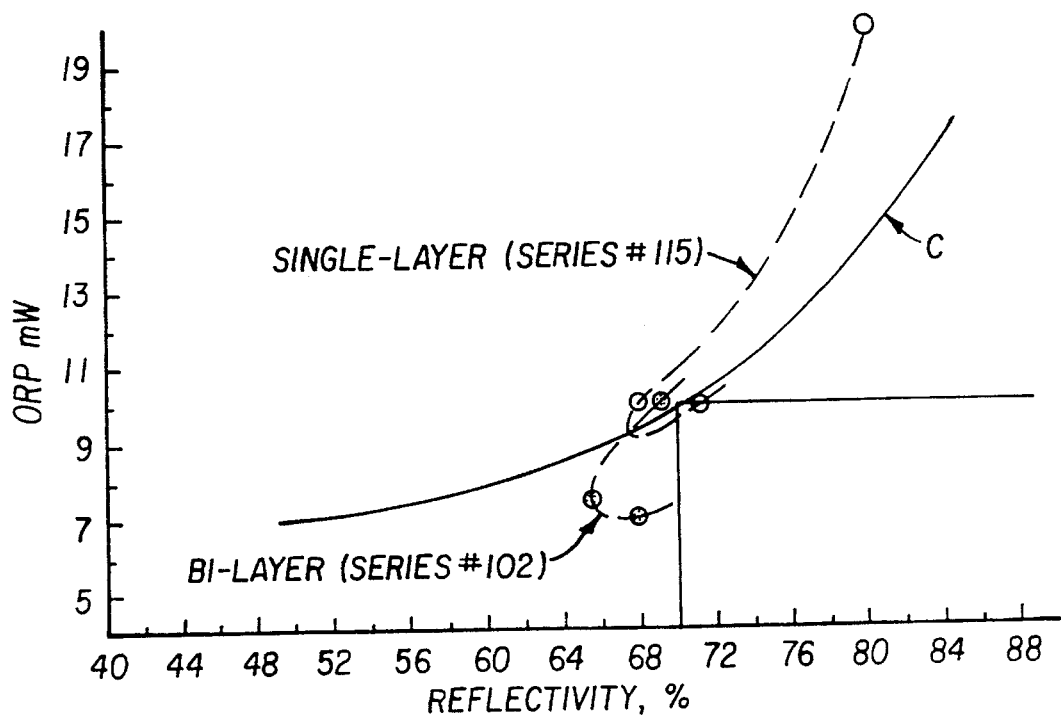
FIG. 4 is a plot of optimum recording power (ORP) vs. reflectivity for a single layer and a bilayer series.

The ORP and % reflectivity for the reflectivity of the above two series are also plotted in FIG. 4—the open circles for the series #115 (single layer) and solid circles for the

PARTS LIST 10 substrate
12 optical recording layer
14 reflecting layer

We claim:

1. A recordable element including a substrate and having on its surface, in order, an optical recording layer and a light reflecting layer, the improvement comprising:

a) the optical recording layer containing $(Te_a Ge_b C_c H_d O_e)$, wherein a, b, c, d, and e are atomic percents and (c+d)>40, d>10, a>5, b>5, and e≧0 such that a+b+c+d+e=100, the recording layer having at least two sublayers of different compositions; and b) the thickness of the optical recording layer and the reflecting layer being selected such that the $R_{min}$ reflectivity of the element is about or greater than 70% for a laser wavelength of about 780 nm.

2. The recording element of claim 1 wherein each sublayer includes elements selected from the group consisting of Ge, Te, and C,H.

3. The recording element of claim 1 wherein the reflecting layer includes elements selected from the group consisting of Au, Ag, Cu, Al, and alloys thereof.

4. The recording element of claim 1 wherein the two sublayers of different compositions being selected such that each of them have different thermal and optical properties.

5. The recording element of claim 4 wherein each sublayer includes elements selected from the group consisting of Ge, Te, and C,H.

6. The recording element of claim 4 wherein the reflective layer includes elements selected from the group consisting of Au, Ag, Cu, Al, and alloys thereof.

7. The recording element of claim 1 wherein the sublayer adjacent to the substrate has a lower hydrocarbon content than the sublayer adjacent to the reflecting layer.

8. The recording element of claim 1 wherein the substrate is polycarbonate.

9. A recordable element comprising a substrate and having on its surface, in order, a recording layer and a light reflecting layer, the improvement comprising:

a) the recording layer containing $(Te_a Ge_b C_c H_d O_e)$, wherein a, b, c, d, and e are atomic percents and (c+d)>40, d>10, a>5, b>5, and e≧0 such that a+b+c+d+e=100, the recording layer having a material composition graded along the thickness; and b) the composition gradient and the thickness of the recording layer and the reflecting layer are such that the $R_{min}$ reflectivity of the element is about or greater than 70% for a laser wavelength of about 780 nm.

10. A process for making a recordable element including a substrate and having on its surface, in order, an optical recording layer and a light reflecting layer, comprising the steps of:

a) providing an optical recording layer by sputtering two sublayers of different compositions so that each of them have different thermal and optical properties containing $(Te_a Ge_b C_c H_d O_e)$, wherein a, b, c, d, and e are atomic percents and (c+d)>40, d>10, a>5, b>5, and e≧0 such that a+b+c+d+e=100, the recording layer; and b) forming the thickness of the optical recording layer and the reflecting layer such that the $R_{min}$ reflectivity of the element is about or greater than 70% for a laser wavelength of about 780 nm.

11. The process of claim 7 wherein the sublayer adjacent to the substrate has a lower hydrocarbon content than the sublayer adjacent to the reflecting layer.

12. The process of claim 5 wherein the substrate is polycarbonate.

13. The process of claim 6 wherein each sublayer includes elements selected from the group consisting of Ge, Te, and C,H.

14. The process of claim 1 wherein the reflecting layer includes elements selected from the group consisting of Au, Ag, Cu, Al, and alloys thereof.

* * * * *